(12) United States Patent
Black et al.

(10) Patent No.: US 8,377,299 B2
(45) Date of Patent: Feb. 19, 2013

(54) WATER FILTERING DEVICE AND SYSTEM

(75) Inventors: Jason Black, New York, NY (US); William Cronley, Dryden (CA)

(73) Assignee: Jason Black, New York, NY (US)

( * ) Notice: Subject to any disclaimer, the term of this patent is extended or adjusted under 35 U.S.C. 154(b) by 304 days.

(21) Appl. No.: 12/753,313

(22) Filed: Apr. 2, 2010

(65) Prior Publication Data
US 2011/0240542 A1 Oct. 6, 2011

(51) Int. Cl.
*B01D 35/30* (2006.01)
*B67D 7/76* (2010.01)
*B01D 35/00* (2006.01)

(52) U.S. Cl. ........ 210/232; 210/472; 210/473; 210/474; 210/416.3; 222/189.06

(58) Field of Classification Search .................. 210/232, 210/472, 473, 474, 470, 416.3; 222/189.06
See application file for complete search history.

(56) References Cited

U.S. PATENT DOCUMENTS 5,567,308 A * 10/1996 Visser ............................ 210/232
6,123,122 A * 9/2000 Dushman ....................... 141/348
6,325,929 B1 * 12/2001 Bassett .......................... 210/238

* cited by examiner

*Primary Examiner* — Nam Nguyen
*Assistant Examiner* — Madeline Gonzalez
(74) *Attorney, Agent, or Firm* — The Law Office of Michael E. Kondoudis

(57) ABSTRACT

A water filtering device and system. The system includes: a rod in a reservoir of the water cooler under an inverted, installed water bottle, the rod aligned with a neck of the water bottle; a hollow cylinder having a diameter less than the neck, an open end, and a closed end opposing the open end, the open end having an external flange at a perimeter thereof with a diameter greater than the neck, the closed end configured to removable retain a water filter, the hollow of the cylinder dimensioned to accept a portion of the rod; a cover having a ring-shaped base and a sidewall, the base having an inner perimeter, an outer perimeter with a diameter greater than the diameter of the flange, the sidewall extending from the base at the outer perimeter, the cover configured to receive at least the flange of the cylinder; and a filter.

11 Claims, 10 Drawing Sheets

WATER FILTERING DEVICE AND SYSTEM

BACKGROUND

1. Technical Field

Embodiments of the present invention relate generally to water filtration and, more particularly, to filter arrangements for bottled water-type water coolers.

2. Description of Related Art

In developed regions, safe drinking water is plentiful and relatively inexpensive. This is because these regions tend to have the financial resources necessary to build and maintain large scale, centralized water processing plants and water delivery infrastructure.

In underdeveloped regions, safe drinking water is often neither plentiful nor inexpensive. Rather, obtaining a supply of safe and affordable drinking water can be a challenge. A primary reason for this challenge is the absence of effective centralized water processing. Underdeveloped regions usually do not have access to capital necessary to build and maintain this infrastructure. Furthermore, even when some centralized water processing is available, the infrastructure necessary to deliver treated water maybe lacking. Thus, alternatives/supplements to centralized water treatment are often necessary.

One successful alternative/supplemental approach to water treatment is to practice decentralized point of use treatment. In point of use treatment, water is treated (physically, chemically and/or biologically) at the point of consumption rather than at a centralized location. In this way, point of use treatment is a decentralized approach.

Another alternative/supplemental approach to water treatment is to obtain water that has been processed remotely at a centralized location. One example of this approach is bottled water.

One known shortcoming of bottled water is that its treatment level and quality may be unknown, non-uniform, and/or difficult to determine. For example, as is known, the quality of some bottled water degrades over time. Thus, some drinkers may opt to treat bottled water using a point of use treatment method. In this way, point of use treatment methods supplement water treatment and ensure the safety of water consumed.

Various point of use water treatment methods are known, including: boiling, chlorination, coagulation, and filtration. Filtration is one of the most convenient and cost-effective point of use treatments. Generally, a water filter removes impurities from water by passing the water through a physical barrier, a chemical process, or a biological process so as to cleanse the water. Examples of water filters include media filters such as an activated charcoal filter.

A convenient way to deliver bottled water is by way of a water cooler. Generally, a water cooler is a device, usually freestanding, that cools and dispenses water. Water coolers come in two types: bottle-less; and bottled.

Bottleless water coolers are connected to a water supply. These coolers rely on the water pressure of the water supply to deliver water.

In contrast to bottleless water coolers, bottled water coolers are free-standing, gravity-powered systems that dispense water in a controlled manner from an installed inverted water bottle. To install the bottle, the bottle is tipped upside down and set onto the dispenser, a probe punctures the cap of the bottle and allows the water to flow into the machine's internal reservoir. On the front, a lever or push button dispenses the water into a cup held beneath the spigot.

Convenient, easy to use, effective and inexpensive arrangements to filter the water from bottle type water coolers is always sought after.

BRIEF SUMMARY

One aspect of the present invention provides a water filter system for a water cooler of the inverted water bottle type, including: a rod that is removably mountable in a reservoir of the water cooler under an inverted, installed water bottle, the rod aligned with a neck of the water bottle; a hollow cylinder having a diameter less than the neck, an open end, and a closed end opposing the open end, the open end having an external flange at a perimeter thereof with a diameter greater than the neck, the closed end configured to removable retain a water filter, the hollow of the cylinder dimensioned to accept a portion of the rod; a cover having a ring-shaped base and a sidewall, the base having an inner perimeter, an outer perimeter with a diameter greater than the diameter of the flange, the sidewall extending from the base at the outer perimeter, the cover configured to receive at least the flange of the cylinder; and a filter that is removably connectable to the closed end of the cylinder. When the cylinder is inserted into the neck up to the flange and the cover receives the cylinder, the cylinder and cover cooperate to: provide a water tight seal that permits only water filtered by the filter to exit the water bottle; and to receive at least a portion of the neck. When the neck is received between the cover and cylinder and the water bottle is in an installed, inserted condition, a portion of the rod extends into the hollow of the cylinder.

Another aspect of the present invention provides a water filtering system for use in a bottle type water cooler that receives an inverted water bottle, including: a base removably mountable in a reservoir of the water cooler, the base including a vertical rod extending upwardly therefrom; and a cap including: a hollow cylinder having an open proximal end, a closed distal end, and a outer flange extending outwardly from a perimeter of the proximal end, the distal end configured to removable retain a water filter and permit filtered water to flow therethough, the cylinder dimensioned to be insertable into a neck of the water bottle up to the outer flange so as to position a received water filter in the bottle, and a cover having a cylindrical sidewall and an inner flange with a central opening that permits the rod to extend therethough, the cover dimensioned and configured to receive the neck and the cylinder. When the cylinder is inserted into the water bottle and the cover is fit around the cylinder such that the flanges are in contact, the filter is disposed in the bottle, the neck is disposed between the cylinder and the cover, and the cylinder and cover cooperate to provide a selective water tight seal between the neck and the filter positioning unit that permits only filtered water to flow out of the bottle into the water cooler. When the cylinder is inserted into the neck, the cover receives the cylinder, and the bottle is in the inverted, installed condition, a portion of the rod extends through the central opening and into the cylinder, via the proximal end.

Still another aspect of the present invention provides a water filtering bottle cap, including: a hollow cylinder having an open proximal end, a closed distal end, and a outer flange extending outwardly from a perimeter of the proximal end, the proximal end configured to receive a portion of a stabilizing rod, the distal end having a water filter holder and configured to permit filtered water to flow therethough, the cylinder dimensioned to be insertable into a neck of the water bottle distal end first up to the outer flange; and a cover having a cylindrical sidewall and an inner flange with a central opening that permits the stabilizing rod to extend therethough, the cover fitting over the cylinder and the neck of the bottle so that the neck is disposed between the cylinder and the cover; and a seal tightening section that encourages a water tight seal between the cap and the water bottle, the seal tightening section including a flexible neck sleeve that engages the neck and, when attached, extends both outwardly and away from the neck toward a body of the bottle, a portion of the sleeve extending beyond the cover, and a collar that engages an exterior of the cover and selectively engages at least a part of the portion of the sleeve beyond the cover, pressing the engaged part of the portion of the sleeve toward the neck. When the cylinder is inserted into the water bottle and the cover is fit around the cylinder such that the flanges are in contact, the filter is disposed only in the bottle, a portion of the neck is disposed between the cap and the cover, and the cap and cover cooperate to permit only filtered water to flow out of the bottle into the water cooler.

A further aspect of the present invention provides a system in which a water filter is attached to the inside of a cap with an integrated one-way air valve which is then fitted onto a standardized water bottle and made air tight with a seal fitted between the cap and neck. Once the filter is attached to the cap and secured onto the neck the bottle is placed inverted onto a water dispenser where the reservoir has a stabilizing rod rising perpendicular from the base of the water tank rising into the neck of the bottle. In operation, gravity pressure forces water through the filter exiting through the hollow cylindrical chamber of the cap. Filtered water then flows down the neck of the bottle into the reservoir and finally out through the spigot attached at the base of the water reservoir. As water flows out the spigot a vacuum is formed and air simultaneously flows into the tank and then through the one-way air valve incorporated onto the cap of the neck in order to equalize pressure inside and outside of the reservoir and water bottle. When the water level in the reservoir rises to cover the mouth of the neck, air can no longer enter the tank through the neck and water ceases flowing from the water bottle into the reservoir. In response to user activation of the spigot, water will drain from the reservoir until below the mouth of the neck when the process occurs. As air enters the one-way air valve, the cylindrical cone inside the one-way air valve rises inside the chamber so as to partially cover an aperture disposed at the top of the chamber. Partial covering of this aperture allows air to pass through the valve in to the tank but prevents the bead from entering into the tank through the valve. Under the influence of gravity, the bead settles into a lower beveled portion of the chamber once pressure in the tank is equalized with atmospheric pressure. A lower aperture surrounded by a beveled portion of the chamber is completely closed when the bead settles into the beveled portion, thereby preventing water from flowing out of the tank through the valve.

These, additional, and/or other aspects and/or advantages of the present invention are: set forth in the detailed description which follows; possibly inferable from the detailed description; and/or learnable by practice of the present invention.

BRIEF DESCRIPTION OF THE DRAWINGS

The present invention will be more readily understood from the detailed description of embodiments thereof made in conjunction with the accompanying drawings of which.

DETAILED DESCRIPTION

Figure 1:
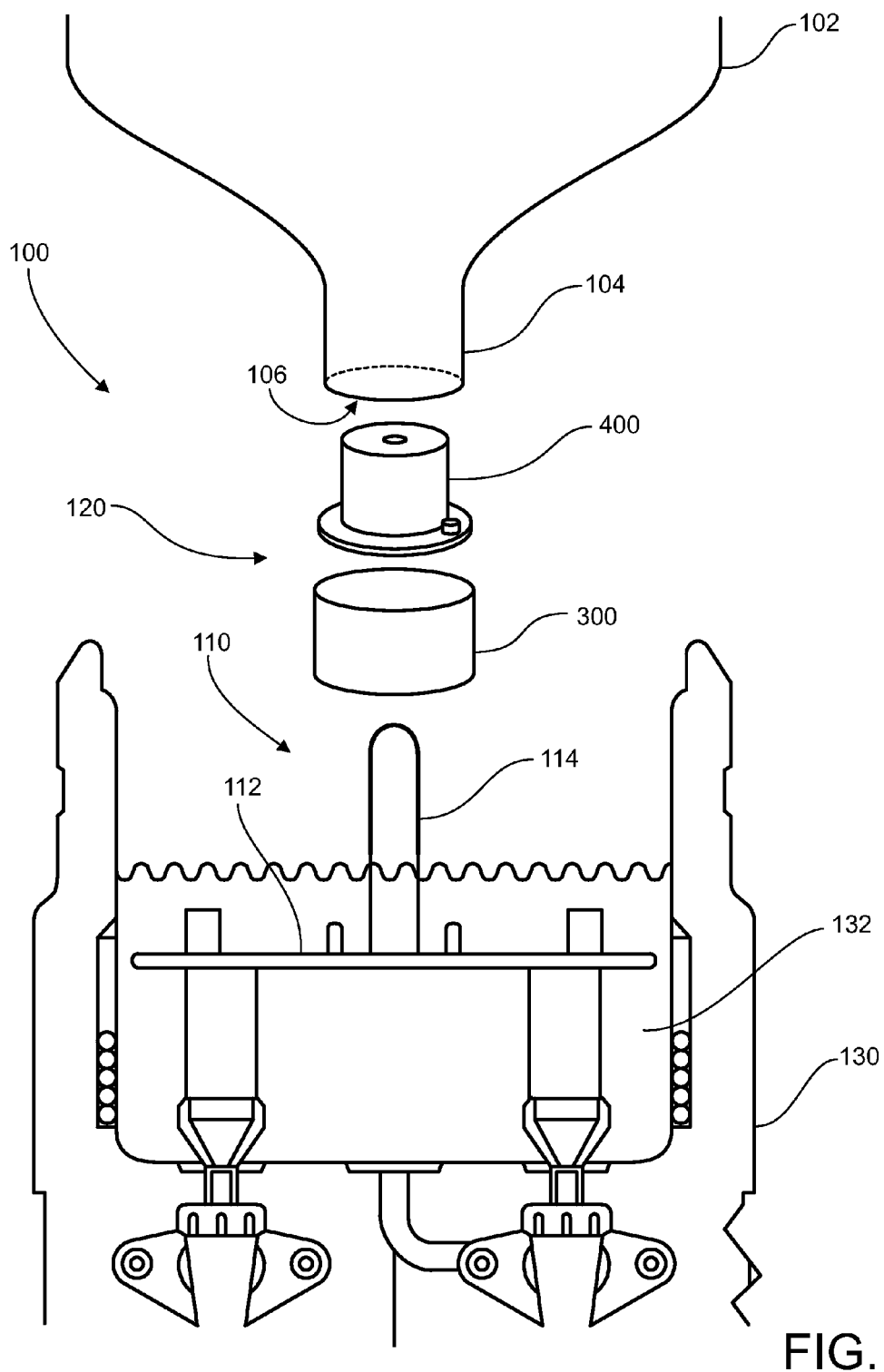
FIG. 1 is an exploded, schematic view of a water filter system consistent with an embodiment of the present invention.

Reference will now be made in detail to embodiments of the present invention, examples of which are illustrated in the accompanying drawings, wherein like reference numerals refer to the like elements throughout. The embodiments are described below to explain the present invention by referring to the figures.

Figure 2:
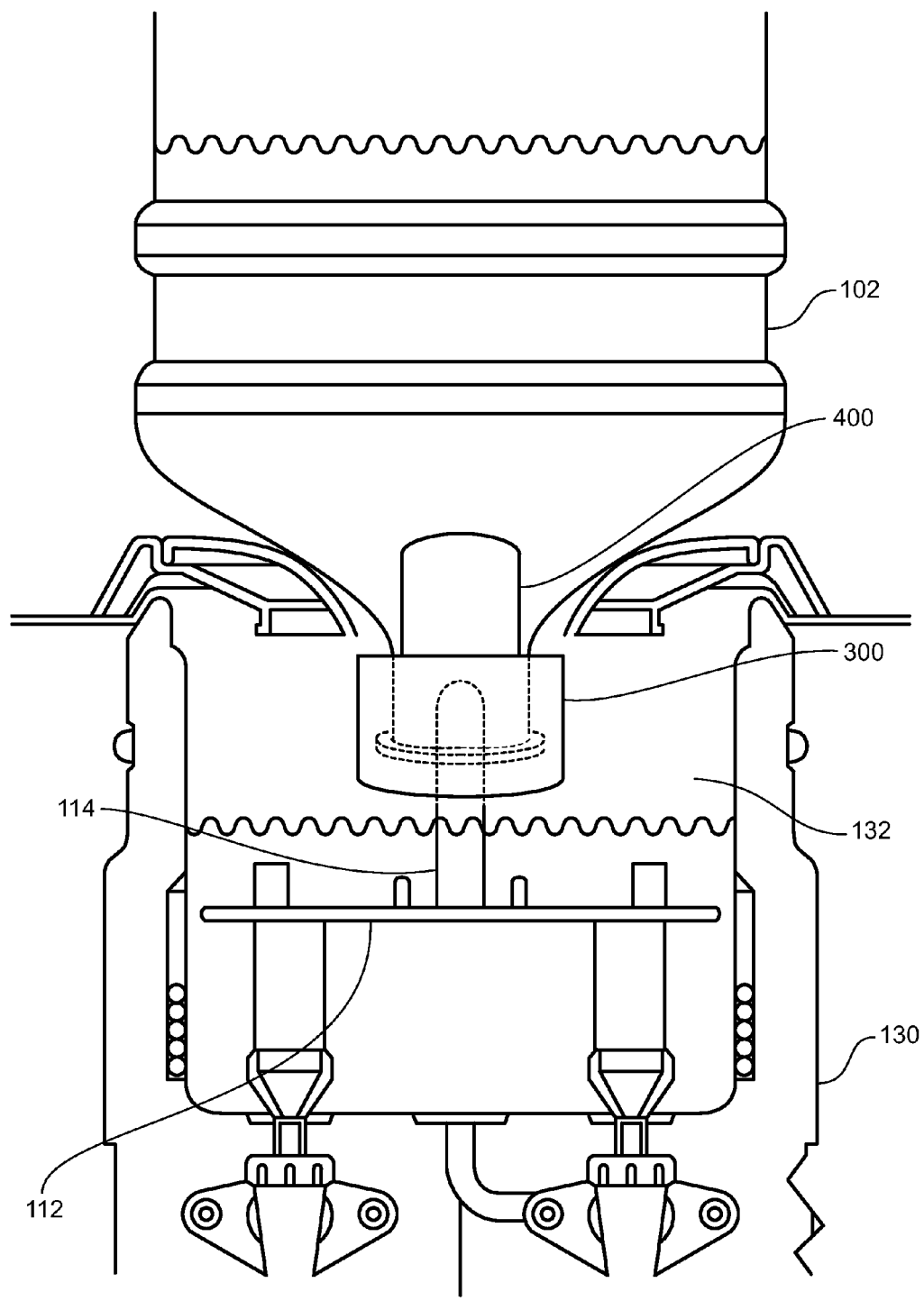
FIG. 2 is a view of a the water filter system of FIG. 1 in an assembled condition.

Referring now to FIGS. 1 and 2, there is illustrated a water filtering system 100 consistent with an embodiment of the present invention. The system 100 includes a base section 110 and a cap 120. Generally, the cap 120 is disposed between the inverted water bottle 102 and the water cooler 130. More specifically, the cap 120 is disposed at the neck 104 of the inverted water bottle 102 with a portion disposed in the neck.

The base section includes a base plate 112 and stabilizing rod 114 extending vertically (upwardly) from the base plate 112. As illustrated in FIG. 1, the stabilizing rod 114 may be perpendicular to the base plate 112. As will be explained in detail below, the rod is dimensioned and configured so that an end 114' of the rod 114 distal to the base 112 is received by the cap 120 when the cap and water bottle 102 are in an installed condition. As FIGS. 1 and 2 illustrate, the vertical rod 114 may be centrally located on the base plate 112 so that the rod is aligned with the neck 104 of the water bottle 102, when the bottle is in an inverted, installed condition.

In this way, the rod 114 stabilizes both the cap 120 and the installed water bottle 102.

The base section 110 is located in a reservoir 132 of water cooler 130. Preferably, the base section 110 is fixedly, yet removably, mounted to the water cooler 130 so as to provide reliable support for the cap 120, as will be explained in detail below. To this end, the base plate 112 may be mounted to the cooler 130 via an interference/frictional fit and/or by one or more nuts and threaded bolts (not shown). It is to be understood, however, that various other mounting arrangements are both possible and contemplated.

Preferably, the base section 110 is formed as a single, unitary formed component.

The cap 120 includes a cover 300 and a cylinder 400.

Figure 3:
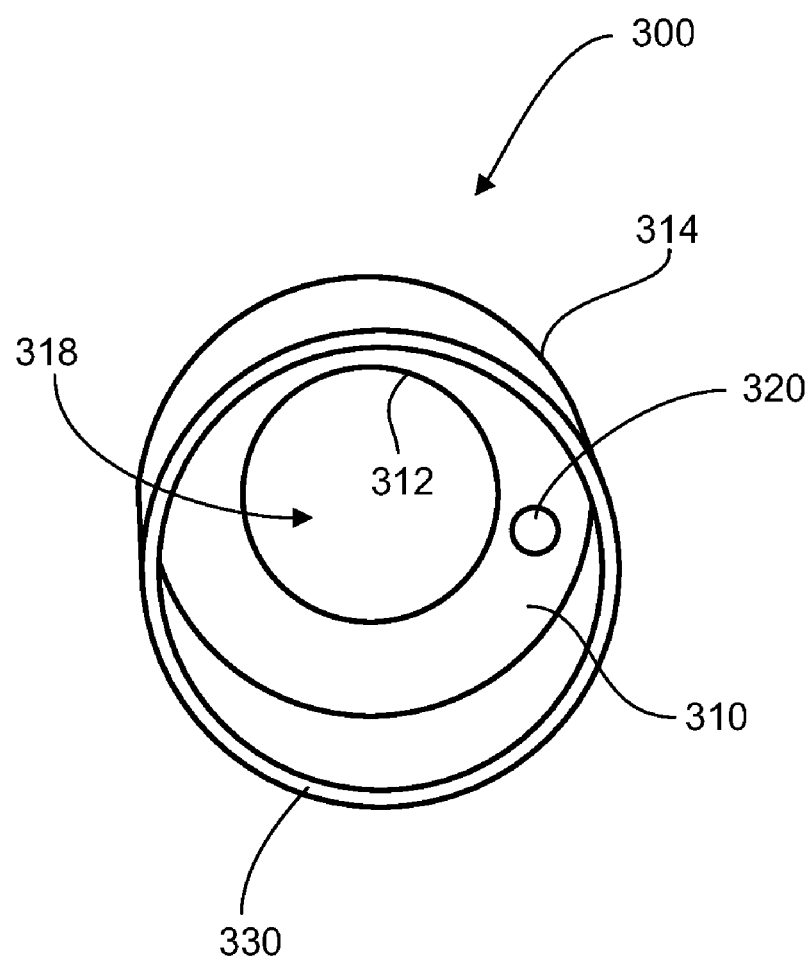
FIG. 3 is a perspective view of a sleeve of the system of FIG. 1.

As illustrated in FIG. 3, the cover 300 includes a peripheral sidewall 330 and an inner flange 310 that comprises a ring-shaped base.

The flange 310 has an inner perimeter 312 and an outer perimeter 314. The inner perimeter 312 defines an opening 318 dimensioned to permit the distal end 114' of rod 114 to pass through, as explained below.

Also, the flange 310 includes an air valve opening 320. The air valve opening 320 is dimensioned and arranged to align with an air valve of the cylinder 400. As will be described below, the air valve opening 320 permits air to flow through the air valve when the cover receives the cylinder 400.

As illustrated, the base 310 may be circular. This is a particularly advantageous configuration because most water bottle necks 104 are also circular. It is to be understood, however, that other configurations are both possible and contemplated, based on various factors including, for example, the shape of the neck 104 of the bottle 102.

The peripheral wall 330 extends upwardly from the outer perimeter 314 of the flange 310. As will be explained below, the peripheral wall 330 cooperates with a sidewall of the cylinder (not illustrated) to receive the neck 104 of a bottle 102 therebetween. In more detail, the cover receives the neck 104 of the bottle 102, with the cylinder 400 inserted inside of the neck 104.

Preferably, the base section 110 is formed as a single, unitary formed component.

Figure 4A:
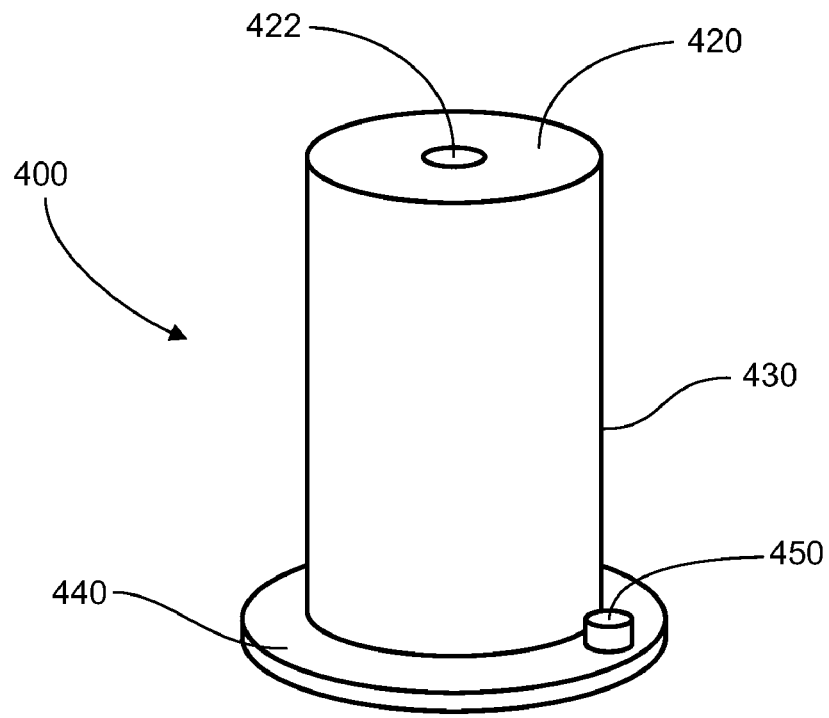
FIGS. 4A and 4B are perspective views of a cylinder of the system of FIG. 1.
Figure 4B:
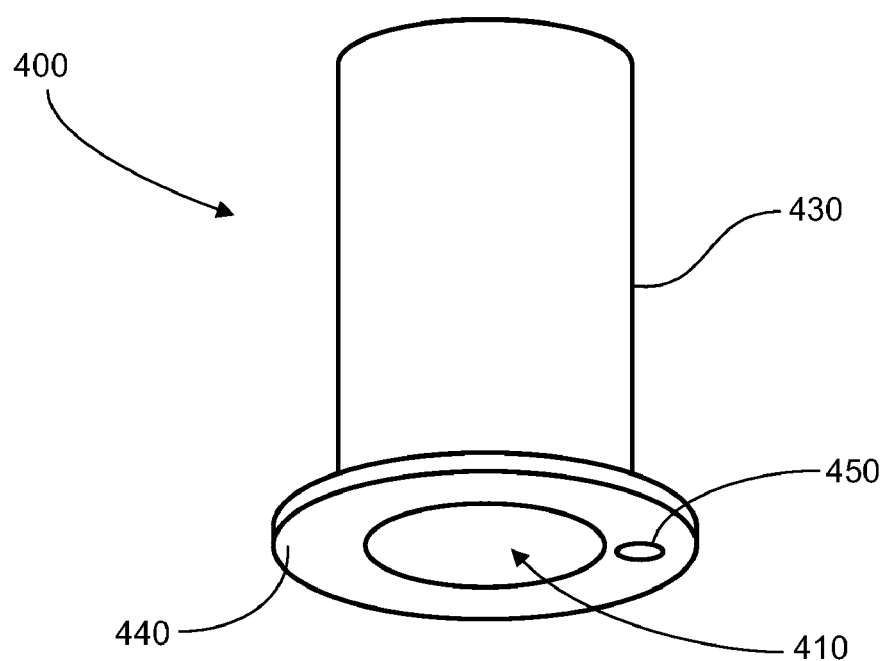

Referring to FIG. 4, there is illustrated the cylinder 400. The cylinder 400 includes an open end 410, a closed end 420, a sidewall 430, an external flange 440 and an air valve 450.

The open end 410 and the cylinder 400 is dimensioned to accept the distal end 114' of the stabilizing rod 114 when the cap 120 is installed on the neck 104 of the bottle 102 and the bottle is in an inverted, installed condition in the cooler 130. The open end 410 comprises a proximal end of the cylinder.

Figure 5A:
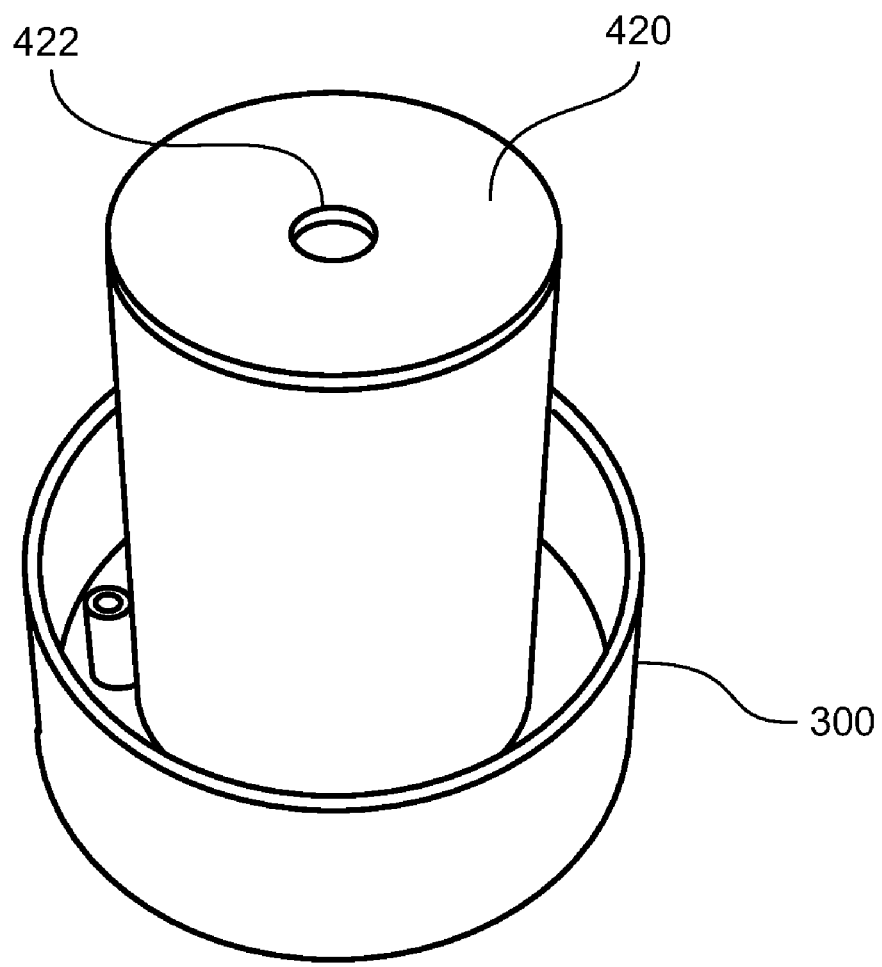
FIGS. 5A to 5C are various perspective views of the cylinder and sleeve in an assembled condition in which they comprise a cap.
Figure 5B:
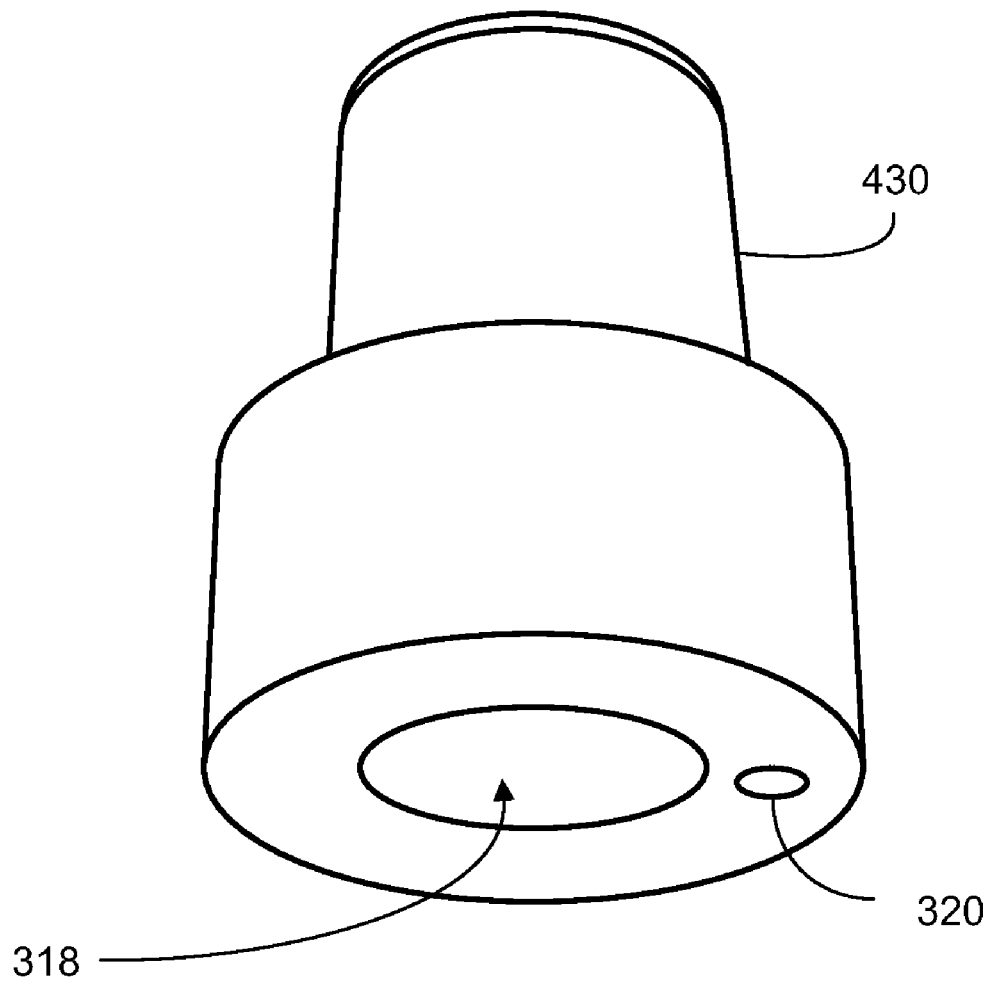
Figure 5C:
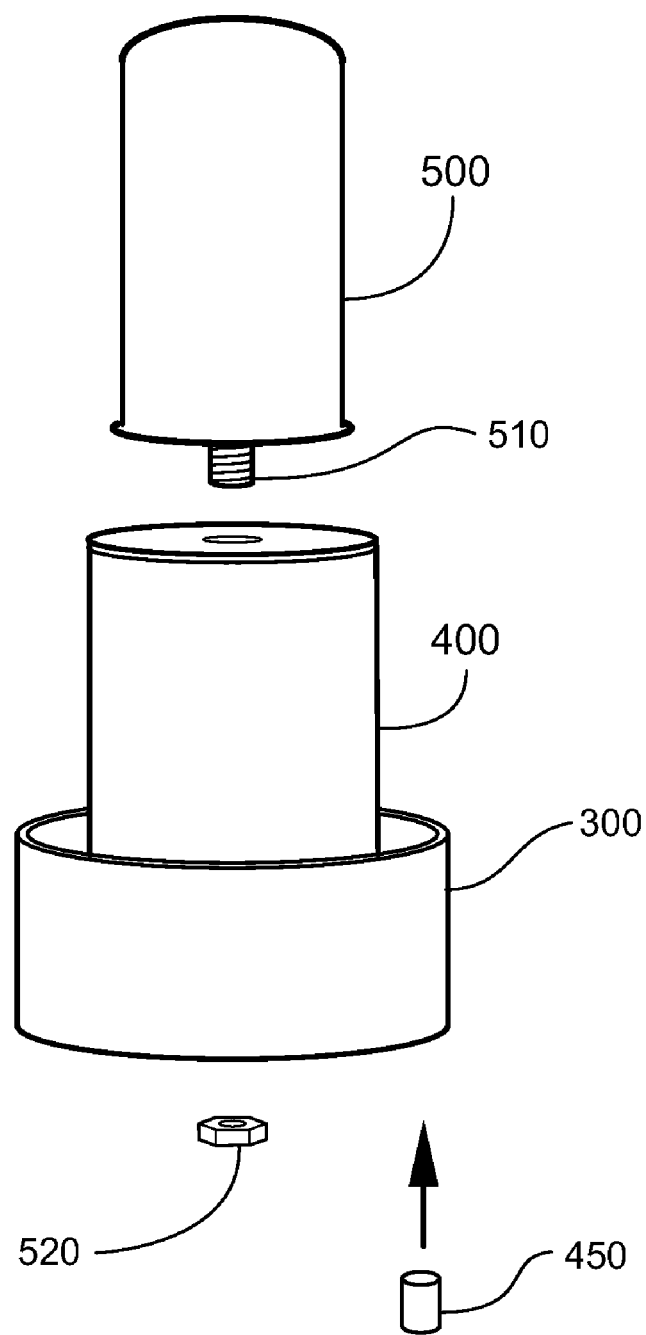

The closed end 420 of the cylinder 400 is configured to removably retain a filter 500 (illustrated in FIGS. 5A-5C). To this end, the closed end 420 may optionally include a through-hole 422 though which a stem 510 of a water filter unit 500 is mountable. Other filter mounting arrangements are both possible and contemplated, however.

The sidewall 430 defines a circumference of the cylinder 400 that is shared with the closed end 420. This circumference is preferably slightly less than that of the neck 104 so as to encourage a water-tight seal with the neck.

The external flange 440 is located at the periphery of the open end 410 of the cylinder 400. The flange 440 may have a diameter greater than the cylinder 400 and the neck 104, as illustrated. Configuring the flange 440 in this way enables the flange 440 to prevent the cylinder from falling into the bottle 102 and to facilitate removal of an installed cylinder from the neck 104.

The cylinder 400 also includes a cylindrical hollow that is defined by the interior of the sidewall 430. Filtered water flows from the bottle 102 into the reservoir 132 via the hollow. The hollow of the cylinder 400 also accommodates the distal end 114' of the stabilizing rod 114 that extends up from the reservoir. This promotes stable suspension of the filter 500 inside of bottle 102.

The cylinder 400 includes an integrated one-way air valve 450 that admits air from the reservoir 132 into the water bottle 102 and prevents untreated water from flowing out of the bottle into the reservoir. The air valve 450 is disposed on the flange 440 such that, when the cylinder 400 is inserted into the neck 102, the air valve is also inserted into the neck 104. This permits the air valve 450 to deliver air into the bottle to reduce the decrease in pressure that results from water flowing out of the bottle.

Optionally, the air valve may use a conical release valve to selectively allow air to flow into the bottle while preventing water from flowing though the valve into the reservoir below. This selective airflow reduces the resulting decrease in air pressure that results when water flows out of the bottle. In this way, the valve equalizes the pressure in the bottle when water is dispensed.

Generally, the cylinder 400 is dimensioned and configured to be selectively insertable into the neck 104 of the bottle 102 via opening 106. Preferably, the cylinder 400 is also dimensioned to fit snuggly into the neck 104 of the water bottle 102 (shown in FIG. 1). As is explained in detail below, in this position, the filter 500 is attached to the closed end 420 of the cylinder 400 so that it is in communication with the hollow of the cylinder. This attachment is made before the cylinder is sealed onto the water bottle.

The flange 440 is dimensioned to fit snuggly into the cover 300. Thus, the diameter of the flange 440 is less than that of the outer perimeter 314 of the base 310.

In cooperation with the cover 300, the cylinder 400 forms a water-tight seal with the neck 104 of the water bottle 102, via an interference fit between the cover and the bottle neck.

FIGS. 5A-5C illustrate the assembled cap 120 comprising the cover 300 and the cylinder 400. As FIG. 5C illustrates, the filter 500 is removably mountable to the cylinder 400 of the cap 120 via a nut 520 and threaded stud 510, for example. This stud is preferably hollow to permit filtered water to flow into the cylinder 400.

Figure 6A:
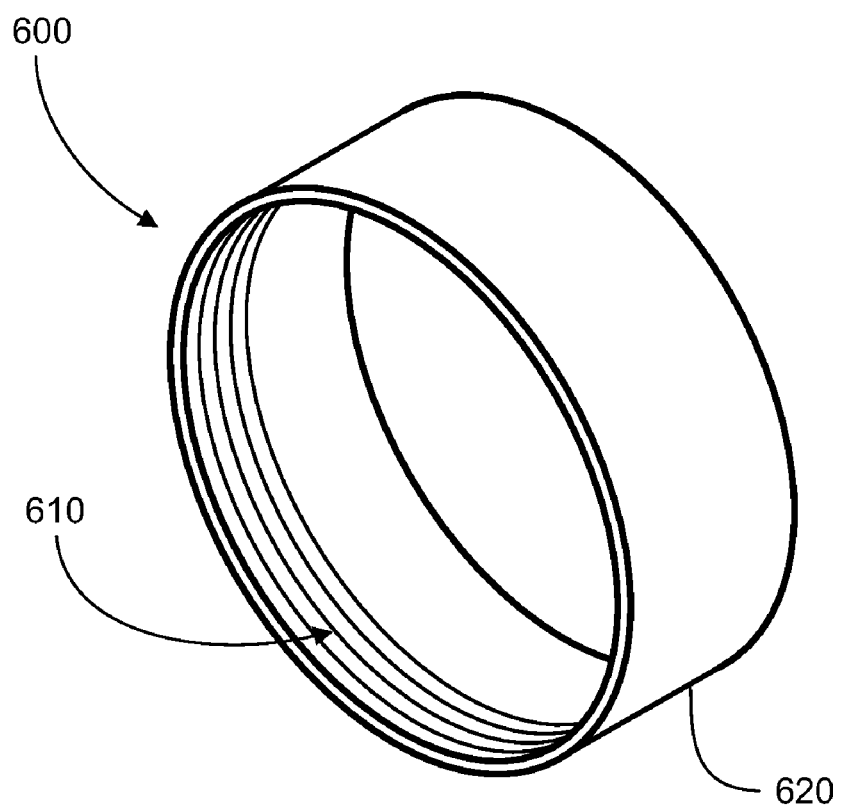
FIGS. 6A and 6B illustrate an optional neck sleeve usable with the system of FIG. 1.
Figure 6B:
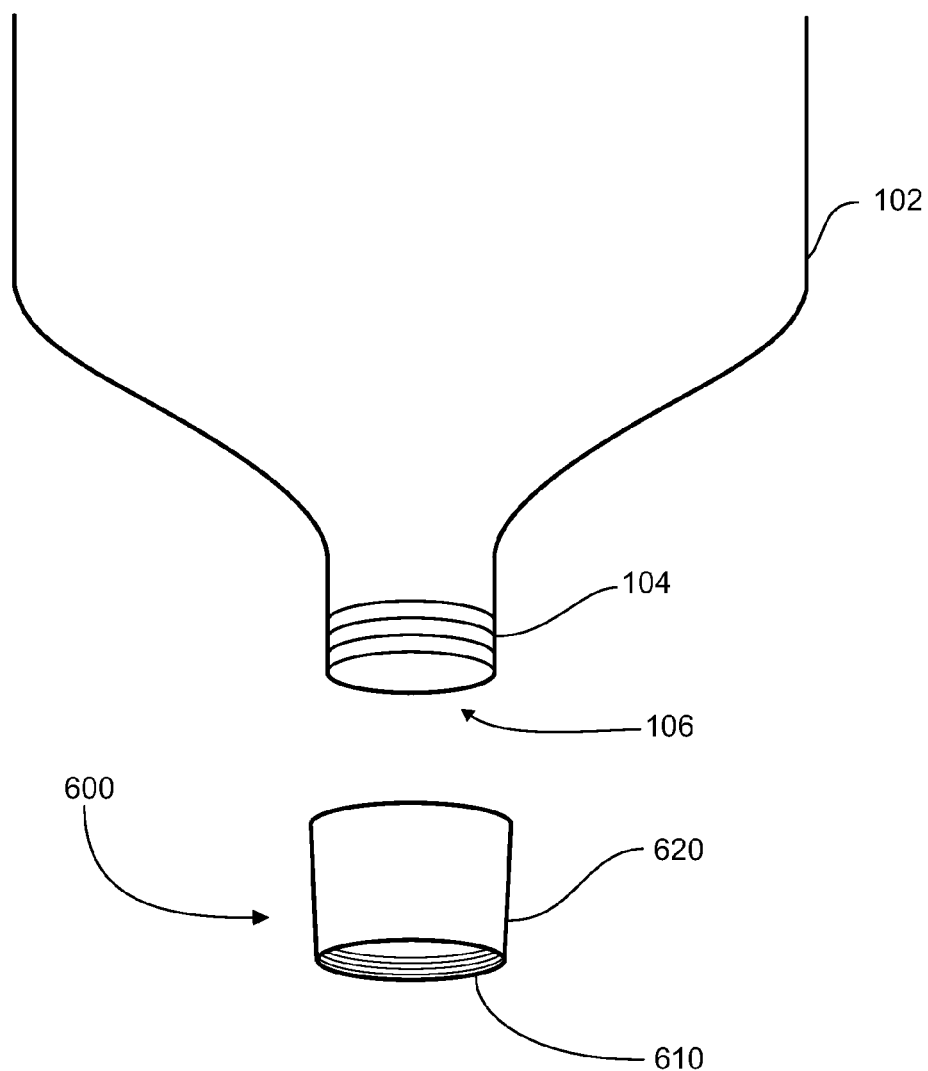
Figure 7:
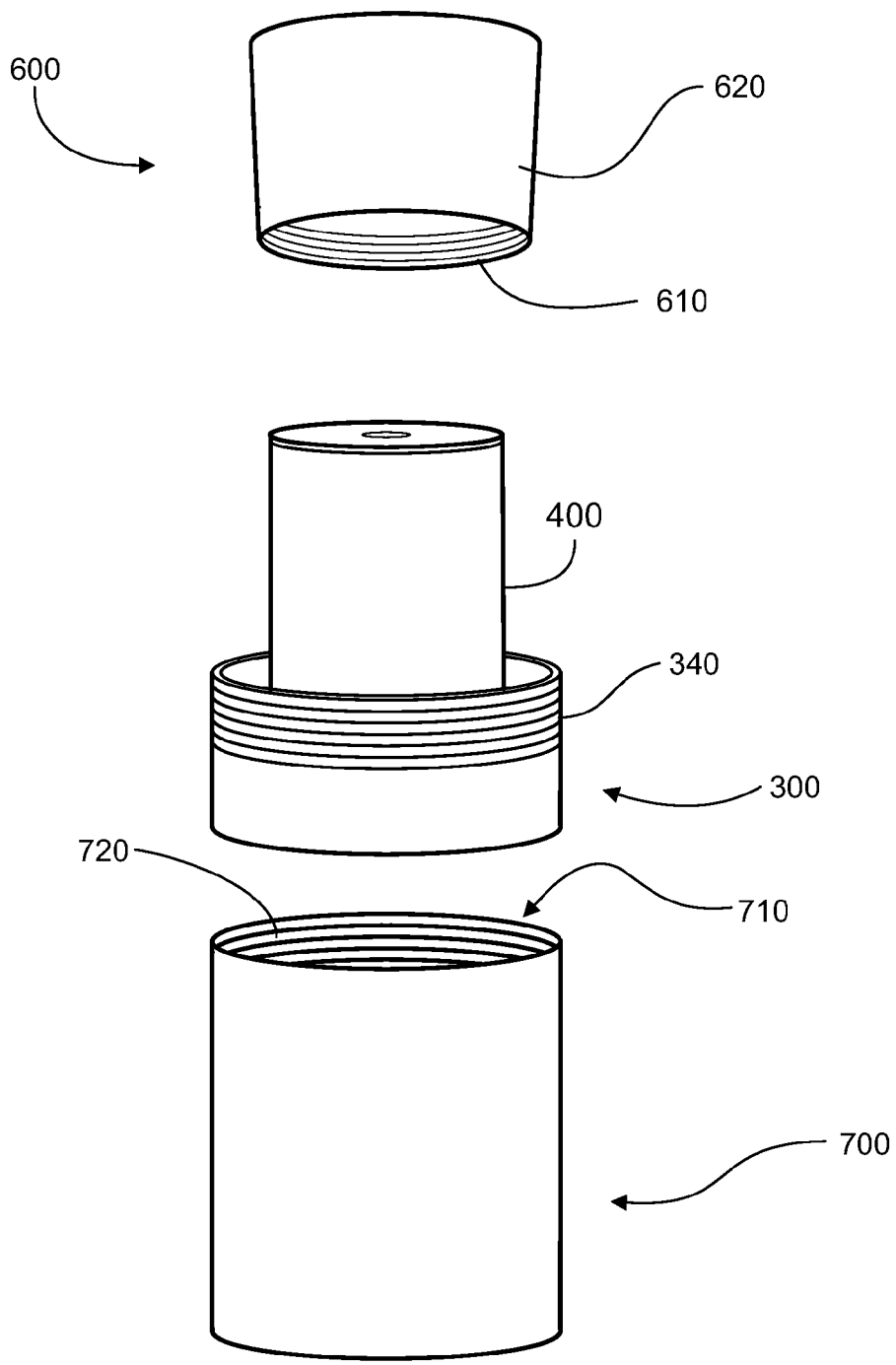
FIG. 7 illustrates an optional collar usable with the system of FIG. 1 and its relationship to the sleeve of FIG. 3 and the optional neck sleeve of FIGS. 6A and 6B.

Referring to FIGS. 6A and 6B, there is illustrated an optional neck sleeve 600 that is usable the water filtering system 100. The neck sleeve 600 includes a neck contacting part 610 and a sealing part 620.

The neck contacting part 610 is configured to fit snuggly over the outer surface of the neck 104 of the water bottle 102. Optionally, as illustrated, this contacting portion 610 may be threaded to mate with a thread of the water bottle neck, when present.

The sealing part 620 flares out from the contacting portion 610 so as to effectively increase the circumference of the neck 610. This shape encourages a water-tight seal between the cap 120 and the bottle 102 when the cap 120 receives the neck 104. To this end, the neck sleeve 600 may be constructed of a flexible material to further encourage a water-tight seal. Also, the contacting portion 610 may extend past the cover 300.

Additionally and/or optionally, a collar 700 may be used in the system 100. The collar 700 includes at open end 710 and is internally threaded 720. As illustrated, the collar may be generally cylindrical in shape.

When the collar 700 is used, the peripheral wall 330 of the cover 300 may include external threads to mate with the internal threads 720. And, so that the collar 700 may engage the exterior of the cover 300, the collar has a diameter greater than the cover.

Generally, the collar 700 cooperates with the sealing part 620 to further enhance a water-tight seal between the cap 120 and the water bottle 102. In more detail, the collar 700 is threaded onto the cover 300 and twisted until the open end 710 extends beyond the peripheral wall 330. As the open end 710 extends past the sleeve 300 it contacts an increasing portion of the sealing portion 620 of the neck sleeve 600 and compresses the contacted portion of the sealing portion inward toward the neck 104. This pressing action encourages a seal between the sealing portion 620 and the neck 104.

Any number of filter types may are usable with the system 100. One particularly advantageous filter that can be used with the system 100 that other systems cannot use is a high-grade filter "candle" with a porous micron size of 2 to 10 microns. This is because of the novel suspension of the filter in embodiments of the present invention. In more detail, due to the shape of the filter, which necessitates that the hollow candle be pointed downwardly into the reservoir, it must be suspended inside the water bottle and not outside whereas other inventions have used stand carbon filters that can reside outside the water bottle and come into contact with the reservoir.

A filter "candle" is the type consistent with those that have a chamber within the cartridge that acts as a tubular air passage where the water passes from outside the filter through the porous medium and into the inside tubular passage where filtered water then flows downward through the end of the "wick." The wick is usually threaded to accept a nut or other device to secure it with an airtight seal whereby the filtered water then flows to a reservoir.

The set up of the system 100 is discussed. First, The filter is attached to the cylinder 400. A hollow threaded stud is provided to attach the filter. Next, the cylinder 400 is seated onto the bottle 102 so that it is in the neck 104 with the filter 500 passing through the neck 102 and the air valve 450 fits inside of the bottle. Then, a user slides the sleeve 300 over the cylinder, lines up the air valve opening, and slides the sleeve down sleeve until it fits flush up into the cylinder 400.

Next, the bottle 102 is inverted and seated so that the cylinder 400 sits on the stabilizing rod 114 extending upwardly from the base 112 of the reservoir 132 into the cylindrical hollow of the cylinder 400, which is in neck 104 of the bottle 102.

Operation of the system 100 is discussed.

Gravity urges water in the bottle to flow through the filter exiting through the hollow cylindrical chamber of the cylinder into the reservoir. Filtered water flows down from the neck of the bottle, through the filter, and into the reservoir, where it may be dispensed via a spigot of the water dispenser.

As water flows out of the bottle, pressure in the bottle decreases.

As water flows out the spigot, pressure in the reservoir decreases causing air to flow into the reservoir though a valve (not shown). When the pressure in the reservoir is greater than the pressure in the water bottle, air flows though the one-way valve of the cylinder into the water bottle in order to equalize pressure inside and outside of the reservoir and water bottle.

Then, when the water level in the reservoir rises to cover the mouth of the neck, air can no longer enter the tank through the neck and water ceases flowing from the water bottle into the reservoir. In response to user activation of a spigot, water drains from the reservoir until the water level is below the mouth of the neck at which time air is drawn into the bottle through the air valve.

Examples of various features/aspects/components/operations have been provided to facilitate understanding of the disclosed embodiments of the present invention. In addition, various preferences have been discussed to facilitate understanding of the disclosed embodiments of the present invention. It is to be understood that all examples and preferences disclosed herein are intended to be non-limiting.

Although selected embodiments of the present invention have been shown and described individually, it is to be understood that at least aspects of the described embodiments may be combined.

Also although selected embodiments of the present invention have been shown and described, it is to be understood the present invention is not limited to the described embodiments. Instead, it is to be appreciated that changes may be made to these embodiments without departing from the principles and spirit of the invention, the scope of which is defined by the claims and the equivalents thereof.

What is claimed is:

1. A water filter system for a water cooler of the inverted water bottle type, comprising:
    a rod that is removably mountable in a reservoir of the water cooler under an inverted, installed water bottle, the rod aligned with a neck of the water bottle;
    a hollow cylinder having a diameter less than the neck, an open end, and a distal end opposing the open end, the open end having an external flange at a perimeter thereof with a diameter greater than the neck, the distal end configured to removably retain a water filter, the cylinder dimensioned to accept a portion of the rod;
    a cover having a ring-shaped base and a sidewall, the base having an inner perimeter, an outer perimeter with a diameter greater than the diameter of the flange, the sidewall extending from the base at the outer perimeter, the cover configured to receive at least the flange of the cylinder;
    a filter that is removably connectable to the distal end of the cylinder; and
    an air valve attached to the flange and disposed in the neck when the cylinder is inserted in the neck up to the flange, wherein the cover includes an air valve throughhole between the perimeters, and when the cylinder is received in the cover and the ring-shaped base is in contact with the flange, the throughhole is aligned with the air valve,
    wherein, when the cylinder is inserted into the neck up to the flange and the cover receives the cylinder, the cylinder and cover cooperate to: provide a water tight seal that permits only water filtered by the filter to exit the water bottle; and to receive at least a portion of the neck, and
    wherein, when the neck is received between the cover and cylinder and the water bottle is in an installed, inserted condition, a portion of the rod extends into the hollow of the cylinder.

2. The system of claim 1, wherein the filter is vertically disposed in the bottle when the cylinder is inserted into the neck.

3. The system of claim 1, wherein the filter is threadedly connected to the cylinder.

4. The system of claim 1, wherein the cylinder includes an air valve, and wherein the air valve is a one-way air valve that has a conical shaped or duck-billed styled valve in the interior to prevent backflow or a one-way air valve that has a baffle type design.

5. A water filter system for a water cooler of the inverted water bottle type, comprising:
    a rod that is removably mountable in a reservoir of the water cooler under an inverted, installed water bottle, the rod aligned with a neck of the water bottle;
    a hollow cylinder having a diameter less than the neck, an open end, and a distal end opposing the open end, the open end having an external flange at a perimeter thereof with a diameter greater than the neck, the distal end configured to removable retain a water filter, the cylinder dimensioned to accept a portion of the rod;
    a cover having a ring-shaped base and a sidewall, the base having an inner perimeter, an outer perimeter with a diameter greater than the diameter of the flange, the sidewall extending from the base at the outer perimeter, the cover configured to receive at least the flange of the cylinder;
    a filter that is removably connectable to the distal end of the cylinder,
    an air valve attached to the flange and disposed in the neck when the cylinder is inserted in the neck up to the flange, wherein the cover includes an air valve throughhole between the perimeters, and when the cylinder is received in the cover and the ring-shaped base is in contact with the flange, the throughhole is aligned with the air valve; and
    a neck sleeve that is removably attached to the neck and, when attached, extends both outwardly and away from the neck toward a body of the bottle,
    wherein the sleeve is dimensioned and configured to receive the neck and at least a portion of the neck cover, and wherein the neck sleeve cooperates with the cylinder and the cover to provide the water tight seal, wherein, when the cylinder is inserted into the neck up to the flange and the cover receives the cylinder, the cylinder and cover cooperate to: provide a water tight seal that permits only water filtered by the filter to exit the water bottle; and to receive at least a portion of the neck, and wherein, when the neck is received between the cover and cylinder and the water bottle is in an installed, inserted condition, a portion of the rod extends into the hollow of the cylinder.

6. The system of claim 5, wherein the neck sleeve is made of a flexible material to encourage a water-tight seal between the bottle neck and the cylinder.

7. The system of claim 5, further comprising a collar that threadedly engages an exterior of the sleeve and presses a portion of the neck sleeve toward the neck.

8. The system of claim 1, wherein, when the neck is received between the cover and the cylinder, the filter is wholly disposed within the water bottle.

9. A water filtering system for use in a bottle type water cooler that receives an inverted water bottle, comprising:
 a base removably mountable in a reservoir of the water cooler, the base including a vertical rod extending upwardly therefrom; and
 a cap including:
  a hollow cylinder having an open proximal end, a distal end, and an outer flange extending outwardly from a perimeter of the proximal end, the distal end configured to removable retain a water filter and permit filtered water to flow therethough, the cylinder dimensioned to be insertable into a neck of the water bottle up to the outer flange so as to position a received water filter in the bottle, and
  a cover having a cylindrical sidewall and an inner flange with a central opening that permits the rod to extend therethough, the cover dimensioned and configured to receive the neck and the cylinder,
 wherein, when the cylinder is inserted into the water bottle and the cover is fit around the cylinder such that the flanges are in contact, the filter is disposed in the bottle, the neck is disposed between the cylinder and the cover, and the cylinder and cover cooperate to provide a selective water tight seal between the neck and a filter positioning unit that permits only filtered water to flow out of the bottle into the water cooler, and
 wherein, when the cylinder is inserted into the neck, the cover receives the cylinder, and the bottle is in the inverted, installed condition, a portion of the rod extends through the central opening and into the cylinder, via the proximal end.

10. The system of claim 9, wherein the outer flange has an air valve, the inner flange has an air valve throughhole and, when the flanges are in contact the air valve throughhole is aligned with the air valve.

11. A water filtering bottle cap, comprising:
 a hollow cylinder having an open proximal end, a distal end, and an outer flange extending outwardly from a perimeter of the proximal end, the proximal end configured to receive a portion of a stabilizing rod, the distal end having a water filter holder and configured to permit filtered water to flow therethrough, the cylinder dimensioned to be insertable into a neck of the water bottle distal end first up to the outer flange;
 a cover having a cylindrical sidewall and an inner flange with a central opening that permits the stabilizing rod to extend therethrough, the cover fitting over the cylinder and the neck of the bottle so that the neck is disposed between the cylinder and the cover; and
 a seal tightening section that encourages a water tight seal between the cap and the water bottle, the seal tightening section including
  a flexible neck sleeve that engages the neck and, when attached, extends both outwardly and away from the neck toward a body of the bottle, a portion of the sleeve extending beyond the cover, and
  a collar that engages an exterior of the cover and selectively engages at least a part of the portion of the sleeve beyond the cover, pressing the engaged part of the portion of the sleeve toward the neck,
 wherein, when the cylinder is inserted into the water bottle and the cover is fit around the cylinder such that the flanges are in contact, the filter is disposed only in the bottle, a portion of the neck is disposed between the cap and the cover, and the cap and cover cooperate to permit only filtered water to flow out of the bottle into a cooler.

* * * * *